United States Patent
Freeman et al.

(10) Patent No.: US 7,290,138 B2
(45) Date of Patent: Oct. 30, 2007

(54) CREDENTIALS AND DIGITALLY SIGNED OBJECTS

(75) Inventors: Trevor W. Freeman, Sammamish, WA (US); John J. Lambert, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 792 days.

(21) Appl. No.: 10/368,972

(22) Filed: Feb. 19, 2003

(65) Prior Publication Data

US 2004/0162985 A1    Aug. 19, 2004

(51) Int. Cl.
*H04L 29/00* (2006.01)
(52) U.S. Cl. ..................................... 713/167
(58) Field of Classification Search ............... 713/167; 709/206; 705/51
See application file for complete search history.

(56) References Cited

U.S. PATENT DOCUMENTS

| | | | | |
|---|---|---|---|---|
| 6,760,752 | B1 * | 7/2004 | Liu et al. .................... | 709/206 |
| 6,772,341 | B1 * | 8/2004 | Shrader et al. ............. | 713/175 |
| 6,986,051 | B2 * | 1/2006 | Le Pennec et al. ......... | 713/188 |
| 2001/0002485 | A1 * | 5/2001 | Bisbee et al. .............. | 713/167 |
| 2002/0129024 | A1 * | 9/2002 | Lee ............................. | 707/10 |
| 2003/0163686 | A1 * | 8/2003 | Ward et al. ................. | 713/156 |

OTHER PUBLICATIONS

Naor and Nissim, "Certificate Revocation and Certificate Update", IEEE Journal on Selected Area in Communications, vol. 18, No. 4, Apr. 2000, pp. 561-570.
Sameshima and Tsutsumi, "Reducing Certificate Revocation and Non-repudiation Service in Public Key Infrastructure", IEICE Trans. Fundamentals, vol. E83-A, No. 7, Jul. 2000, pp. 1441-1449.

* cited by examiner

*Primary Examiner*—Kambiz Zand
*Assistant Examiner*—Andrew L Nalven
(74) *Attorney, Agent, or Firm*—Lee & Hayes, PLLC

(57) ABSTRACT

Object management is facilitated by signing objects with credentials and through noting and/or using an association between the signed objects and the signing credentials. In an exemplary method implementation, actions include: signing an object with a credential to produce a signed object and noting an association between an object identifier that represents the signed object and the credential. In another exemplary method implementation, actions include: receiving a revocation request for a signed object; accessing a database at an entry for the signed object to retrieve an associated credential, the associated credential having been used to sign an object to produce the signed object; and causing the associated credential to be revoked. In an exemplary electronically-accessible media implementation, a data structure thereof includes: at least one entry that associates a credential with an object identifier, the object identifier representing a signed object that was signed by the credential.

66 Claims, 8 Drawing Sheets

| Database | | | 512 |
|---|---|---|---|
| 602(1) | Credential A | ⟺ | Object Identifier #1 |
| 602(2) | Credential B | ⟺ | Object Identifier #2 |
| 602(3) | Credential A | ⟺ | Object Identifier #3 |
| ⋮ | ⋮ | ⋮ | ⋮ |
| 602(N) | Credential N | ⟺ | Object Identifier #n |

CREDENTIALS AND DIGITALLY SIGNED OBJECTS

TECHNICAL FIELD

This disclosure relates in general to using credentials to digitally sign objects and in particular, by way of example but not limitation, to associating individual credentials with individual objects in order to tie the lifetime and viability of an object to the time span and validity of a credential.

BACKGROUND

Computers are utilized in personal, professional, educational and other aspects of life to perform functions and provide services. These functions and services are performed and provided via software that runs on the computers. Historically, software was delivered to computers by manually inserting media into the computer or a peripheral attached thereto and loading the software from the media onto the computer. There was some measure of intrinsic security or reassurance that the software being loaded was from the intended and expected manufacturer thereof based on the physical packaging and the distribution channel, such as a retail outlet or a trusted mail order source.

With the advent and proliferation of the Internet and other hostile networks, software distribution expanded into electronic delivery. Although not so limited, electronic software delivery is especially common with smaller programs, upgrades, patches, and the like. When downloading software electronically over the Internet, however, much of the traditional indicia of the source of such software is missing and/or may be more easily fraudulently imitated. To combat such concerns, the computer software industry has relied on secure protocols such as one or more ciphering mechanisms.

One frequently used cipher mechanism is for the manufacturer of a piece of software code to digitally sign the code. The digital signature serves to ensure that the software code (i) has been produced by the claimed and expected manufacturer (i.e., author authentication) and (ii) as being unaltered during the electronic delivery of the software code (i.e., integrity verification). This digital signature security is enabled using, for example, some public-key infrastructure (PKI) approach. Under such a PKI approach, a user of a computer may have software electronically delivered over the Internet and installed on the computer with increased assurance that the software is not of a false origin and has not been maliciously modified.

One prevalent PKI approach is implemented in accordance with the X.509 standard. With the X.509 standard, a certificate authority facilitates the evidencing of a source of software by issuing a public-key certificate (or certificate) to manufacturers of software code. Each manufacturer of software code uses its certificate to digitally sign its software code to produce signed software code. The signed software code is also significantly more secure from an integrity perspective than unsigned code.

Unfortunately, the certificate can be compromised by theft, corruption, carelessness, and so forth. Once compromised, the certificate can no longer authenticate authorship or evidence data integrity for software code. To prevent the continued use or misuse of a compromised certificate, the certificate is revoked. To revoke a certificate, the certificate authority places the certificate on a certificate revocation list. Once a certificate lands on the certificate revocation list, users of computers are made aware that all software code signed (at least from the time of compromise) are no longer secure and should not be trusted. Hence, anything and everything signed with the compromised certificate (at least after the date of compromise) loses its viability with respect to secure electronic delivery or installation and use.

When a certificate is revoked because it has become compromised, the mechanisms of X.509 are functioning properly because all software code that has been signed by the certificate is indeed suspect and untrustworthy. However, certificates are also revoked when it is determined that software code that was signed by the certificate is faulty. Faulty software code includes code that intrinsically harms a computer or the information therein and code that opens a door through which a malevolent hacker can perform deleteriously exploits. In these situations, many pieces of software code are effectively rendered useless in order to address a single piece of defective software code. This is a frustrating result, which intimates that the mechanisms of X.509 are being applied in an ineffective manner.

Many manufacturers of software address faulty pieces of code by incessantly producing software patches or fixes. Unfortunately, these software patches and fixes are only effective if the users of computers proactively seek out, download, and install them. This reliance on proactive behavior by the users of computers is itself a security risk, especially because time delays between an announcement of a software patch or fix and any ultimate installation thereof introduces unavoidable security holes.

Accordingly, there is a need for schemes and techniques to grow PKI-based approaches to software code security and management and/or to address the handling of software code that is determined to be defective.

SUMMARY

Object management is facilitated by signing objects with credentials and through noting and/or using an association between the signed objects and the signing credentials. In an exemplary method implementation, actions include: signing an object with a credential to produce a signed object and noting an association between an object identifier that represents the signed object and the credential. In another exemplary method implementation, actions include: receiving a revocation request for a signed object; accessing a database at an entry for the signed object to retrieve an associated credential, the associated credential having been used to sign an object to produce the signed object; and causing the associated credential to be revoked. In an exemplary electronically-accessible media implementation, a data structure thereof includes: at least one entry that associates a credential with an object identifier, the object identifier representing a signed object that was signed by the credential. Other method, system, media, and arrangement implementations are described herein.

BRIEF DESCRIPTION OF THE DRAWINGS

The same numbers are used throughout the drawings to reference like and/or corresponding aspects, features, and components.

DETAILED DESCRIPTION

Figure 1:
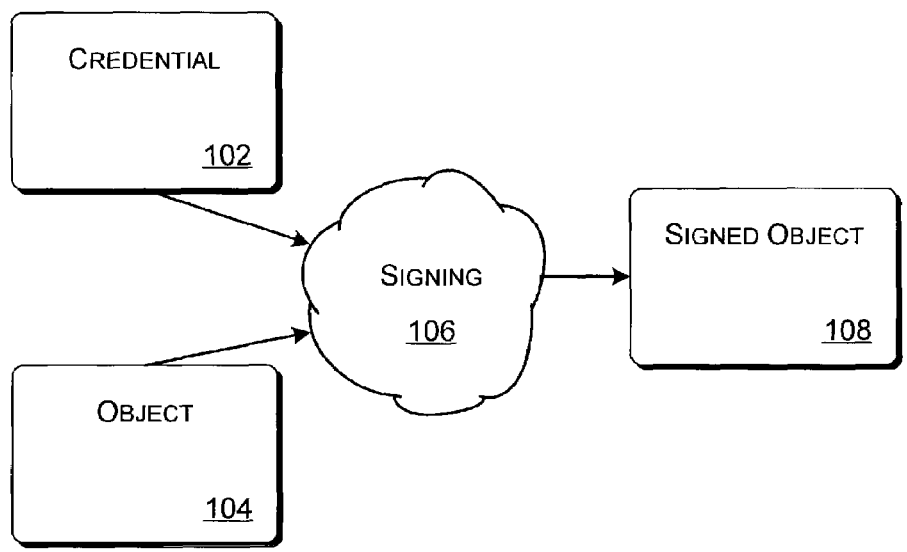
FIG. 1 illustrates an exemplary signing of an object using a credential.

FIG. 1 illustrates an exemplary signing 106 of an object 104 using a credential 102. Specifically, credential 102 is used in a signing process 106 to produce signed object 108 from object 104. Credential 102 may be, for example, an X.509-compliant public-key certificate. Alternatively, credential 102 may comport with any standardized, generalized, and/or specialized ciphering mechanism such that credential 102 may be used to (e.g., digitally) sign object 104 to produce signed object 108. Exemplary aspects of credential 102 are described below with particular reference to FIG. 2.

Object 104 may be comprised of any one or more types of data and/or information, and optionally multiple instances thereof. Examples of such an object 104 include software code, a program, a routine, a document, a (e.g., financial) transaction, a contract, a driver, an active web control, a file, any executable component, some combination thereof, and so forth.

In a described implementation, signing object 104 using credential 102 binds one or more aspects of credential 102 in a manner that tends to prevent unnoticeable alteration of object 104 (i.e., tends to maintain integrity) and fraudulent misidentification of the source of object 104 (i.e., tends to authenticate authorship). This binding produces signed object 108, which may be considered to have a relatively high level of integrity and authenticity.

Figure 2:
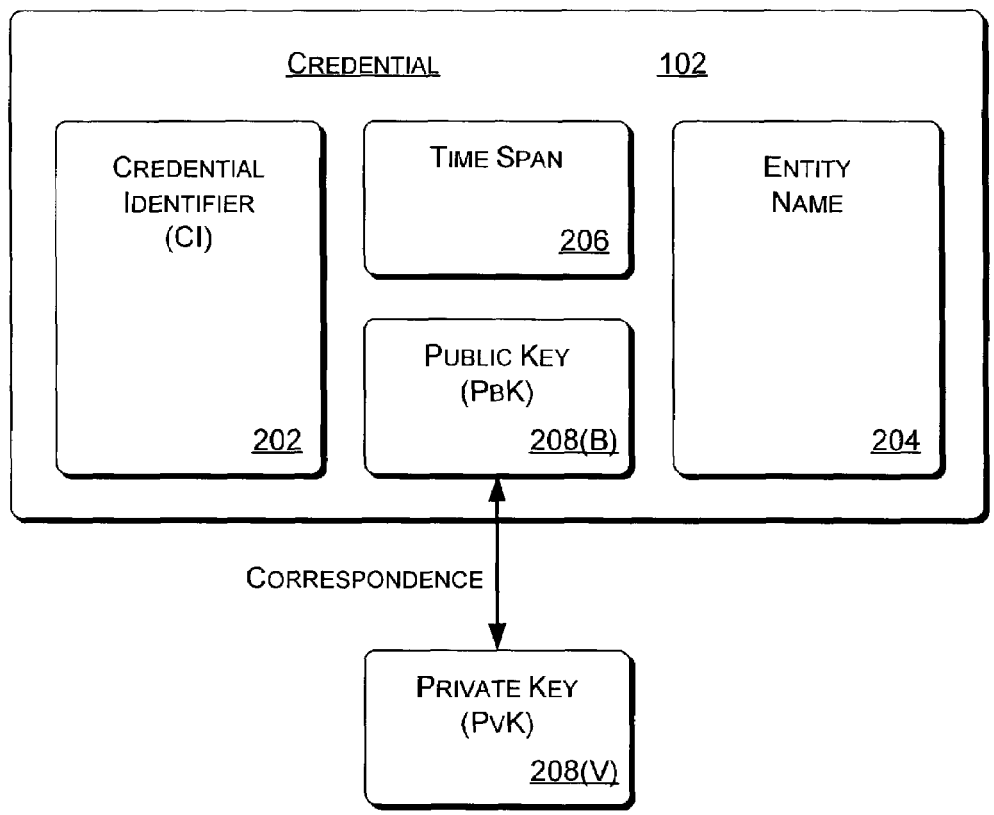
FIG. 2 is an exemplary credential that illustrates aspects thereof.

FIG. 2 is an exemplary credential 102 that illustrates aspects 202-208. These exemplary aspects include a credential identifier (CI) 202, an entity name 204, a time span 206, and at least part of a public-private key pair 208. Credential identifier 202 may be an alphanumeric, binary, or other designation, and it identifies credential 102. In an X.509 context, credential identifier 202 comprises an X.509 serial number. In a described implementation, credential identifier 202 is unique, at least within a given defined arena of consideration. This uniqueness and defined area are described further below with particular reference to FIG. 3.

Entity name 204 reflects the entity to which credential 102 has been issued. Although the term "name" is employed herein, entity name 204 may include any alphanumeric, binary, or other designation for the entity. Time span 206 reflects the time span for which credential 102 is intended to be valid prior to expiration (i.e., absent revocation). Such a time span 206 may be practically instantaneous, three days, a year and a day, 20 years, 99 years, and so forth. Alternatively, time span 206 may be omitted if credential 102 is intended to be valid into perpetuity absent any revocation. Time span 206 may also include the date of issuance for credential 102.

Public-private key pair 208 is present if credential 102 is utilized in conjunction with a PKI approach that employs asymmetric ciphering with a public key (PbK) 208(B) and a corresponding private key (PvK) 208(V). Credential 102 may instead be utilized with symmetric ciphering techniques and/or in other PKI approaches. With a key pair 208, private key 208(V) is typically utilized by the entity of entity name 204 to implement signing 106 (of FIG. 1) to produce signed object 108. Public key 208(B) is typically utilized during the security verification process by potential users of signed object 108 and/or by the credential authority that issued credential 102.

Although illustrated in FIG. 2, entity name 204, time span 206, and either or both halves of key pair 208 need not be part of credential 102 in all implementations and/or need not be present for a particular credential 102 at all points or at all locations in the implementations as described herein. Examples are noted hereinbelow. Also, although not illustrated in FIG. 2, credential 102 may include an aspect that refers to the credential authority that issued the credential to the named entity.

Figure 3:
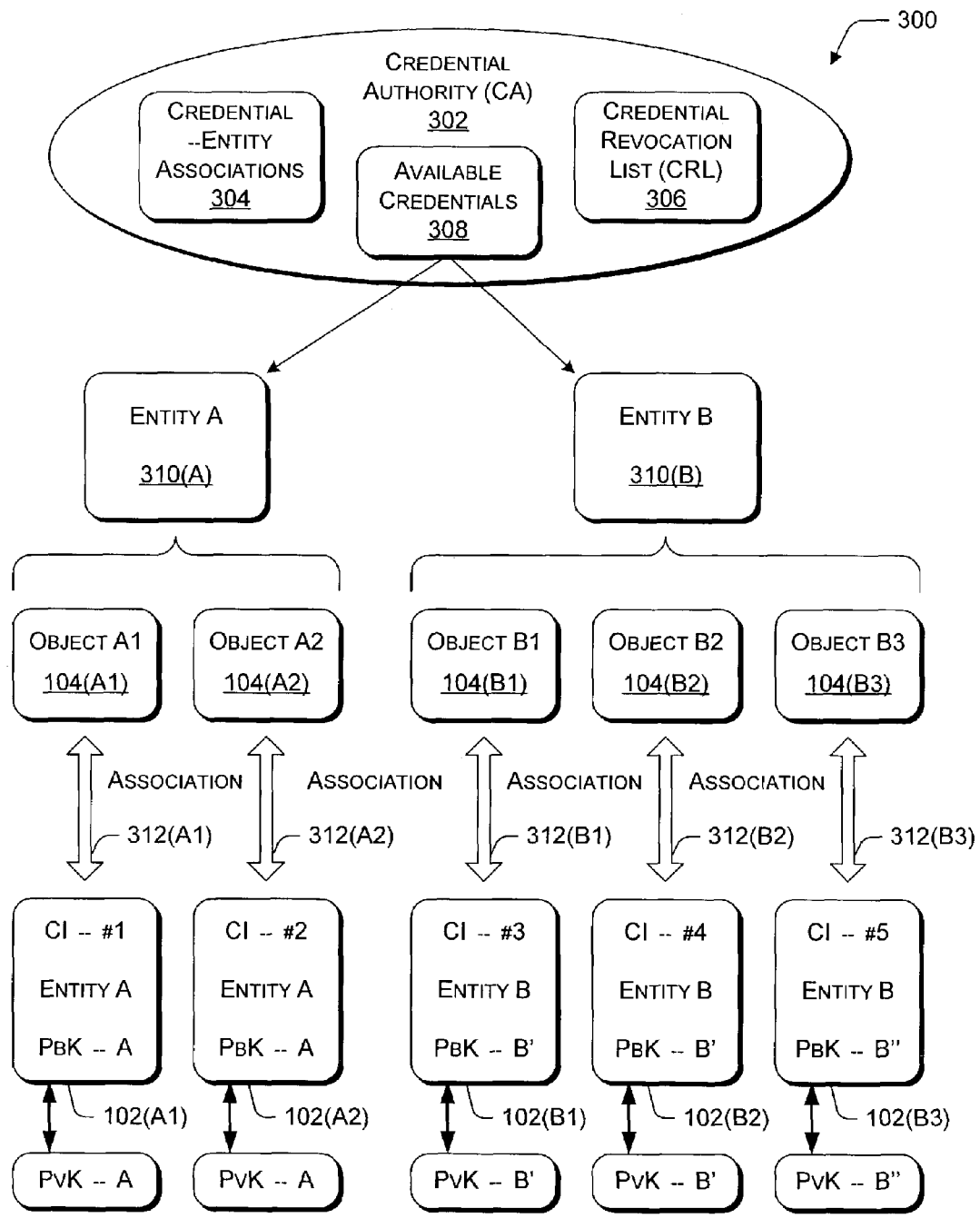
FIG. 3 illustrates an exemplary object-credential paradigm in which individual objects are associated with individual credentials for multiple entities.

FIG. 3 illustrates an exemplary object-credential paradigm 300 in which individual objects 104 are associated with individual credentials 102 for multiple entities 310. A credential authority (CA) 302 provides credentials 102 to entities 310. Each entity 310 has objects 104 that are associated with credentials 102. Specifically, entity A 310(A) has object A1 104(A1) and object A2 104(A2), and entity B 310(B) has object B1 104(B1), object B2 104(B2), and object B3 104(B3).

Credential authority 302 includes credential-entity associations 304, a credential revocation list (CRL) 306, and available credentials 308. Available credentials 308 include credentials 102 that may be assigned to entities 310. These credentials 102 of available credentials 308 may be created as they are requested, may be created in groups and then issued as requested, and so forth. Also, credentials 102 of available credentials 308 may be given credential identifiers 202 that are in sequential order, that are randomly selected, and so forth.

Credential-entity associations 304 log which particular credentials 102 (previously of available credentials 308) are assigned to which particular entities 310. Credential-entity associations 304 may be realized, for example, as any general data structure such as an electronically-accessible database. Credential revocation list 306 includes indications of those credentials 102 that have been revoked and are therefore no longer valid. Credential revocation list 306 may also be realized, for example, as any general data structure such as an electronically-accessible database. For instance, credential revocation list 306 may be an extensible markup language (XML)-based file.

In a described implementation, users of computers occasionally or periodically receive credential revocation list 306 for analysis with reference to a signed object 108 (of FIG. 1). If the signed object 108 is determined to have been signed by a particular credential 102 that is included in credential revocation list 306, then the user and/or the computer thereof considers the signed object 108 as being no longer viable. For example, a signed object 108 that is a contract would be considered as being no longer in force, and a signed object 108 that is an executable file would not be selected for installation and execution.

Available credentials 308 are assigned by credential authority 302 to entities 310. Specifically, credentials 102(A1) and 102(A2) are issued to entity A 310(A), and credentials 102(B1), 102(B2), and 102(B3) are issued to entity B 310(B). Each of credentials 102 is illustrated as having a credential identifier 202, an entity name 204, and at least part of a public-private key pair 208 (of FIG. 2).

Instead of using the same credential to indiscriminately sign different objects ad infinitum (at least until expiration of the credential), different objects 104 are associated with different credentials 102. Specifically, object A1 104(A1) has an association 312(A1) with credential 102(A1). Object A2 104(A2) has an association 312(A2) with credential 102(A2), and object A2 104(A2) has an association 312(A2) with credential 102(A2). Also, object B1 104(B1) has an association 312(B1) with credential 102(B1), object B2 104(B2) has an association 312(B2) with credential 102(B2), and object B3 104(B3) has an association 312(B3) with credential 102(B3).

Each of the illustrated objects 104 may be considered signed objects 108 once the associated credential 102 has been used to digitally sign them. These associations 312 are noted for future reference. Consequently, an association 312 can be used to independently terminate the viability of an individual signed object 108 (not explicitly so labeled in FIG. 3) by revoking the associated credential 102.

As illustrated in FIG. 3, the credential identifier (CI) of each of the credentials 102(A1), 102(A2), 102(B1), 102(B2), and 102(B3) differs from every other credential identifier. Thus, the credential identifiers may be considered as unique on a worldwide or universal basis, or the credential identifiers may at least be considered as unique on a credential authority 302 by credential authority 302 basis. Alternatively, credential identifiers may be reused between/among different entities 310 such that the credential identifiers are unique within any set of credentials 102 that are assigned to a single entity 310. In such an alternative, the entity name along with the credential identity may be used by credential authority 302 to uniquely identify an individual credential 102.

Furthermore, although object-credential paradigm 300 illustrates each credential 102 as only being used once, each credential 102 may instead be used more than once. For example, there may be a first association between a credential and a first object and a second association between the credential and a second object. This is possible, and even perhaps preferable, when two or more objects are so closely related such that it will almost always be desirable to terminate the viability of both or all of them simultaneously. A contract and an addendum thereto, for instance, may both be digitally signed by the same credential. Thus, the association(s) between (i) the contract and the credential and (ii) the addendum and the credential is(are) noted for future reference.

For any given entity 310, the public and private keys of the public-private key pairs 208 may be the same or may differ from one credential 102 to another credential 102. For example, credentials 102(A1) and 102(A2) each use the same public-private key pair (designated A). Also, credentials 102(B1) and 102(B2) each use the same public-private key pair (designated B'). Credential 102(B3), on the other hand, uses a public-private key pair (designated B") that differs from the public-private key pair (designated B') used by credentials 102(B1) and 102(B2). Hence, all credentials 102 for a given entity 310 may share the same public-private key pair, all credentials 102 for a given entity 310 may have different public-private key pairs, or the multiple credentials 102 for a given entity 310 may reuse public-private key pairs anywhere along a continuum between these two extremes.

Figures 4, 6:
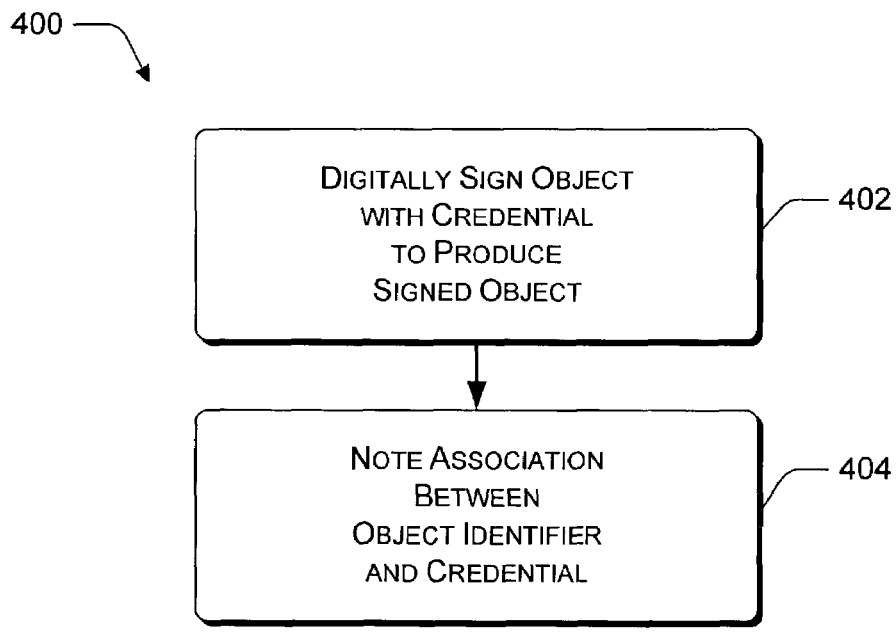
FIG. 4 is a flow diagram that illustrates an exemplary method for enabling object security and/or management through digital signature and credential association.
FIG. 6 is a database that illustrates exemplary object-credential associating.

FIG. 4 is a flow diagram 400 that illustrates an exemplary method for enabling object security and/or management through digital signature and credential association. Flow diagram 400 includes two method blocks 402 and 404. At block 402, an object is digitally signed with a credential in order to produce a signed object. For example, as illustrated in FIG. 1, an object 104 may undergo a signing process 106 using a credential 102 to produce a signed object 108.

At block 404, an association between the credential and an object identifier for the signed object is noted. For example, an association 312 between an object identifier for the signed object 108 (or the object 104) and the credential 102 may be noted. The noting may be effectuated by storing the object identifier in association with the credential 102 in a memory, by sending the object identifier in association with the credential 102 across a transmission medium, and so forth.

The object identifier for the signed object 108 may be realized in any one or more of a multitude of options. These options include (i) a title of the object, (ii) a description/abstract/summary/table of contents/index of the object, (iii) the entirety of the object, (iv) a hash value resulting from application of a hashing function to the object/signed object, (v) some combination thereof, and so forth. Specific exemplary implementations that further illuminate these terms and concepts are provided below with particular reference to FIGS. 5 and 6.

Figure 5:
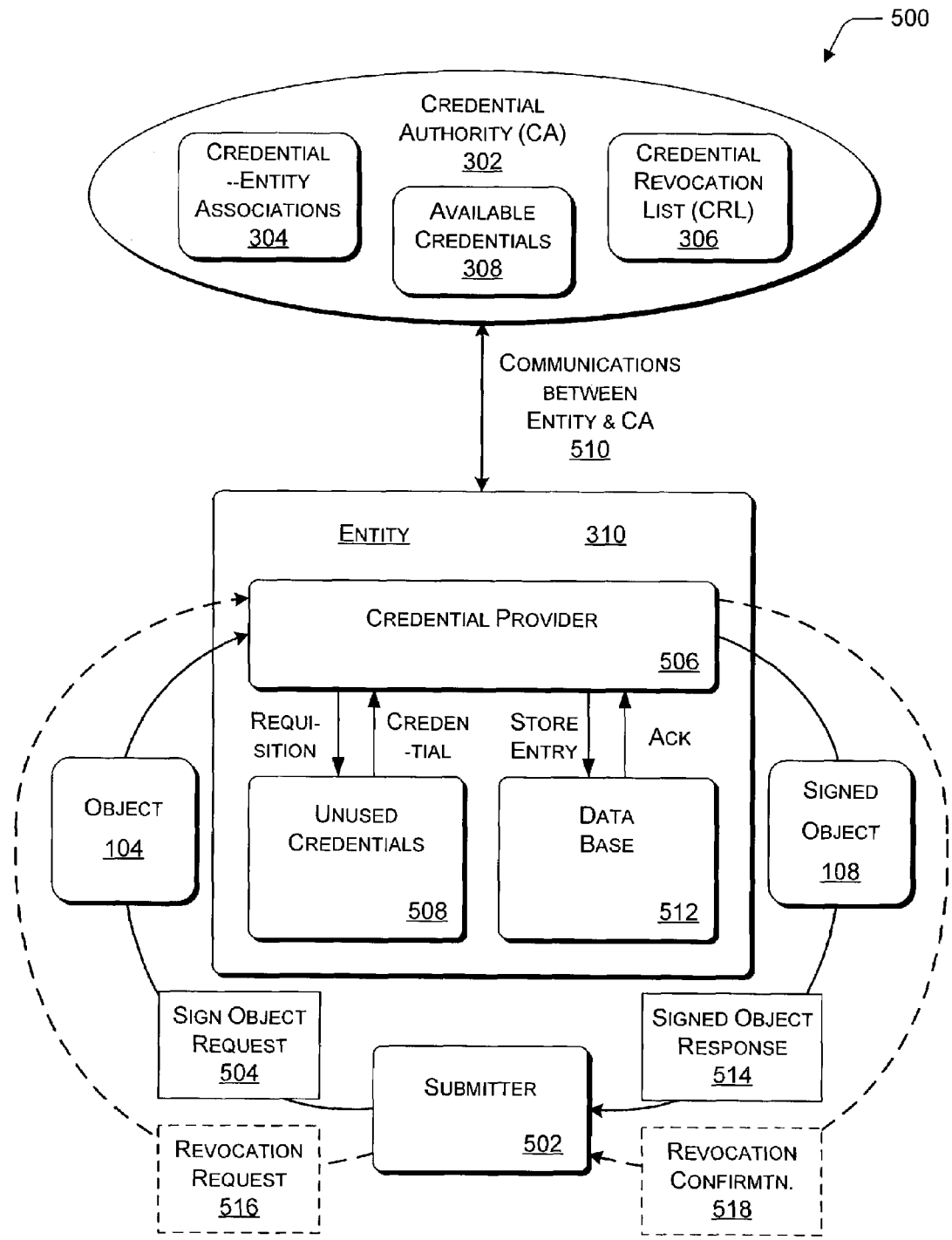
FIG. 5 illustrates another exemplary object-credential paradigm in which a relatively large entity is handling objects and the signing thereof.

FIG. 5 illustrates another exemplary object-credential paradigm 500 in which a relatively large entity 310 is handling objects 104 and the signing thereof. Credential authority 302 issues credentials 102 (of FIGS. 1-3) from available credentials 308 to entity 310 via the communications between the entity & the CA 510. These credentials 102 may be stored at unused credentials 508. In a described implementation, relatively large entity 310 represents an exemplary entity that is sufficiently large so that object management functions may be segregated from other functions within the entity. Examples of such relatively large entities 310 include a large software company, a large legal firm or department, and so forth.

Although graphically illustrated separately, submitter 502 may be, and typically is, part of entity 310. Submitter 502 provides a sign object request 504 along with or including object 104 that is to be digitally signed by a credential 102. Sign object request 504 and object 104 are accepted by credential provider 506. Credential provider 506 may be a single person, a department, one or more electronic devices such as a computer, some combination thereof, and so forth. However, in a relatively large entity 310, credential provider 506 is typically a department that is charged with the responsibility for handling digital signature of objects. Such a department is responsible for safeguarding keys, signing objects with credentials, communicating internally with submitters, communicating externally with credential authorities, and/or managing credential-object associations, and so forth.

In response to sign object request 504, credential provider 506 requisitions a credential 102 from unused credentials 508. In this described implementation, entity 310 is issued multiple unused credentials from available credentials 308 before they are actually needed from credential authority 302. Credential authority 302 may be a root credential authority, an intermediate credential authority, and so forth. After extracting a credential 102, credential provider 506 performs a signing process on object 104 using credential 102 to produce signed object 108.

Before, during, and/or after the signing process, credential provider 506 prepares and stores an entry in a database 512. The entry indicates an association between credential 102 and an object identifier for object 104/signed object 108. An exemplary implementation of database 512 is described further below with particular reference to FIG. 6. After the signing process, credential provider 506 forwards signed object 108 along with or as part of a signed object response 514. Submitter 502 may then utilize signed object 108 as desired.

From time to time, submitter 502 may discover that it is desirable to cancel the viability of signed object 108. In other words, it may be appropriate to indicate to anyone and everyone concerned that signed object 108 is no longer viable for the purpose for which it was intended. For example, a contract may be declared unenforceable by a court, a piece of software may be determined to have a bug/defect in it, and so forth. When this is discovered, submitter 502 prepares a cancellation/revocation request 516 and provides it to credential provider 506. Revocation request 516 may itself include the object identifier for the affected signed object 108 or it may only include sufficient indicia of signed object 108 such that credential provider 506 may determine the object identifier therefore.

Credential provider 506 accesses database 512 using the object identifier of the signed object 108 that is to be rendered unenviable. From database 512, credential provider ascertains the credential 102 that is associated with signed object 108 because it was used to sign object 104 to produce signed object 108. This credential 102, which includes at least the credential identifier 202 thereof, is retrieved from database 512. Using at least credential identifier 202 to identify the credential 102 that is to be revoked, credential provider 506 makes a request to central authority 302 to revoke credential 102.

This request is made as part of communications between the entity and the CA 510. Upon receiving the request, credential authority 302 places credential 102 on credential revocation list 306. The placement of a credential 102 on credential revocation list 306 indicates to anyone checking on the security or efficacy of a signed object 108 that the credential 102 is no longer valid and any such signed object 108 should no longer be considered viable. Credential authority 302 acknowledges the request and the placement of credential 102 on credential revocation list 306 via communications between the entity and the CA 510.

Upon receiving the acknowledgement, credential provider 506 may store an indication in database 512 at the entry for the object 104/signed object 108 and the signing credential 102. This indication indicates that the signing credential 102 has been revoked and the signed object 108 has been canceled. Credential provider 506 also provides a revocation confirmation 518 to submitter 502.

FIG. 6 is a database 512 that illustrates exemplary object-credential associating. Database 512 includes multiple entries 602(1), 602(2), 602(3) 602(N). As illustrated, there are object identifiers #1, #2, #3 . . . #n, and there are credentials A, B, A . . . N, respectively. Each entry 602 includes a credential field that is associated with an object identifier field (e.g., by linking one to the other). For example, entry 602(2) includes credential B in association with object identifier #2, and entry 602(3) includes object identifier #3 in association with credential A. Any database organization may alternatively be used for database 512 that is capable of signifying an association between a signed object 108 and the credential 102 that was used to sign it. For example, entries 602(1) and 602(3) may be combined into a single entry 602 because the same credential A was used to sign the objects of both object identifier #1 and object identifier #3.

Although not so illustrated, each of the credential fields may include a unique credential so that no credential 102 is repeated or reused to sign more than a single object 104. In such a situation, there would be a one-to-one correspondence between signed objects 108 (and their object identifiers) and the credentials 102 that have been used to sign them. As described above, object identifiers may be (i) a title of the object, (ii) a description/abstract/summary/table of contents/index/etc. of the object, (iii) the entirety of the object, (iv) a hash value resulting from application of a hashing function to the object/signed object, (v) some combination thereof, and so forth.

Figure 7:
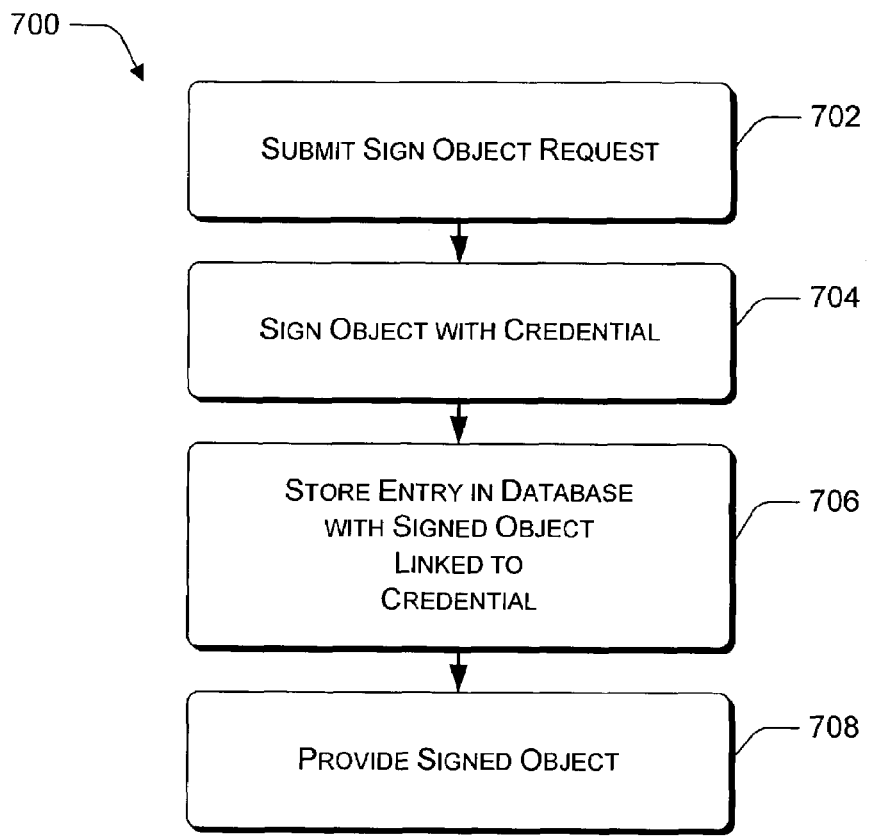
FIG. 7 is a flow diagram that illustrates an exemplary method for creating a signed object with credential association.

FIG. 7 is a flow diagram 700 that illustrates an exemplary method for creating a signed object with credential association. Flow diagram 700 includes four (4) method blocks 702-708. At block 702, a sign object request is submitted. For example, a submitter 502 (of FIG. 5) may submit a sign object request 504 to a credential provider 506. Alternatively, this action may be omitted if there is no separate digital-identity-creating department within an entity 310. Also, smaller entities may submit object signing requests directly to credential authority 302, representatives thereof, or a third-party service provider.

At block 704, the object is signed with a credential to produce a signed object. For example, a credential 102 from a credential authority 302 may be used to sign an object 104 to produce a signed object 108. At block 706, an entry that links the signed object to the credential is stored in a database. For example, an entry 602 (of FIG. 6) may be stored in a database 512 by the credential provider 506, with the entry 602 linking the credential 102 and an object identifier for the object 104/signed object 108.

At block 708, the signed object is provided. For example, the signed object 108 may be provided from the credential provider 506 to the submitter 502. Again, this action may be omitted if there is no separate digital-identity-creating department within an entity 310. Also, a smaller entity 310 may receive the signed object 108 directly from the credential authority 302, representatives thereof, or a third-party service provider. The action(s) of block 708 may occur before, during or after those of block 706.

Figure 8:
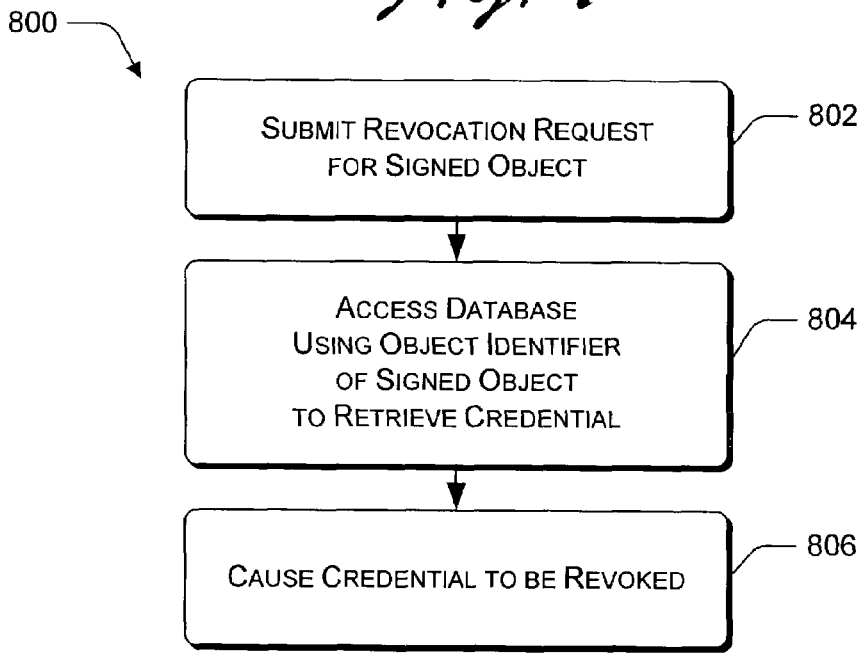
FIG. 8 is a flow diagram that illustrates an exemplary method for canceling a signed object with credential association using credential revocation.

FIG. 8 is a flow diagram 800 that illustrates an exemplary method for canceling a signed object with credential association using credential revocation. Flow diagram 800 includes three (3) method blocks 802-806. At block 802, a revocation request for a signed object is submitted. For example, a submitter 502 may submit a cancellation/revocation request 516 to a credential provider 506, the revocation request requesting the revocation of a credential 102 that signed an object 104 to produce a signed object 108. Alternatively, this action may be omitted if there is no separate digital-identity-creating department within an entity 310.

At block 804, a database is accessed using an object identifier for the signed object to retrieve a credential that is linked thereto or otherwise associated therewith. For example, the credential provider 506 may use an object identifier that identifies or represents (and may optionally be derived from) the signed object 108 to locate an entry 602 that links the credential 102 to the object identifier of the signed object 108. After the credential is ascertained, the credential is caused to be revoked at block 806. For example, the credential provider 506 may send a communication to a credential authority 302 that requests that the credential 102, which is associated with the signed object 108, be revoked by placing the credential 102 on a credential revocation list 306 of the credential authority 302.

Figure 9:
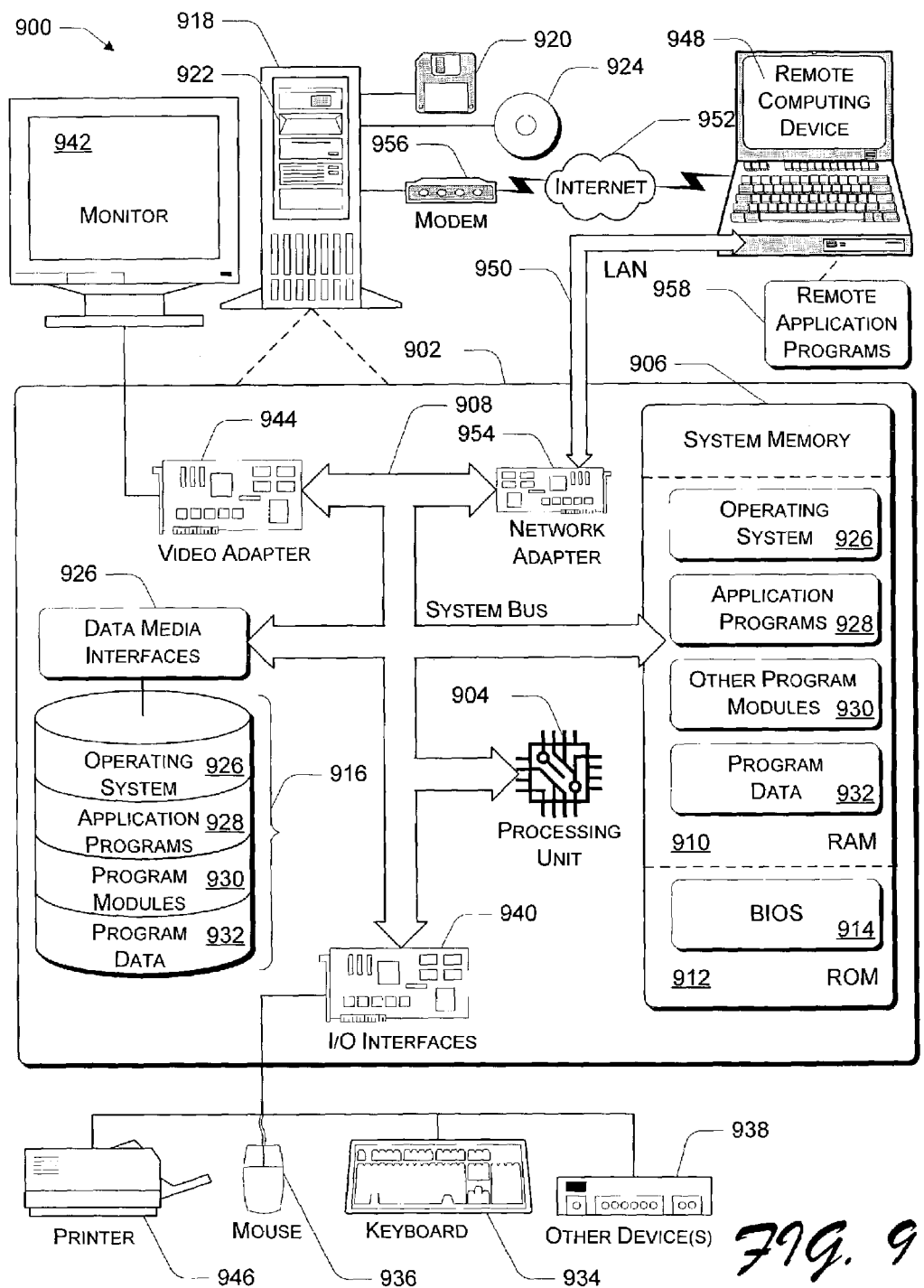
FIG. 9 illustrates an exemplary computing operating environment that is capable of (wholly or partially) implementing at least one scheme or mechanism as described herein.

FIG. 9 illustrates an exemplary computing operating environment 900 that is capable of (fully or partially) implementing at least one scheme or mechanism for enabling object security and/or management through digital signature and credential association. Computing environment 900 may be utilized in the computer and network architectures described below.

Exemplary computing operating environment 900 is only one example of a computing environment and is not intended to suggest any limitation as to the scope of use or functionality of the applicable computer and network architectures. Neither should computing environment 900 be interpreted as having any dependency or requirement relating to any one or any combination of components illustrated in FIG. 9.

The management and/or use of objects that are signed with credentials may be implemented with numerous other general purpose or special purpose computing system environments or configurations. Examples of well known computing systems, environments, and/or configurations that may be suitable for use include, but are not limited to, personal computers, server computers, thin clients, thick clients, personal digital assistants (PDAs) or mobile telephones, hand-held or laptop devices, multiprocessor systems, microprocessor-based systems, set top boxes, programmable consumer electronics, network PCs, minicomputers, mainframe computers, distributed computing environments that include any of the above systems or devices, and so forth.

Implementations with credentials and digitally signed objects, as well as associations therebetween, may be described in the general context of electronically-executable instructions. Generally, electronically-executable instructions include routines, programs, objects, components, data structures, etc. that perform particular functions or implement particular abstract data types. Digitally signing objects using credentials, as described in certain implementations herein, may also be practiced in distributed computing environments where functions are performed by remotely-linked processing devices that are connected through a communications network. Especially in a distributed computing environment, electronically-executable instructions may be located in separate storage media, executed by different processors, and/or propagated over transmission media.

The computing environment 900 includes a general-purpose computing device in the form of a computer 902. The components of computer 902 may include, by are not limited to, one or more processors or processing units 904, a system memory 906, and a system bus 908 that couples various system components including processor 904 to system memory 906.

System bus 908 represents one or more of any of several types of bus structures, including a memory bus or memory controller, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of electronically-accessible media. Such media may be any available media that is accessible by computer 902 or another electronic device, and it includes both volatile and non-volatile media, removable and non-removable media, and storage and transmission media.

System memory 906 includes electronically-accessible media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules/instructions that are immediately accessible to and/or presently operated on by processing unit 904.

Computer 902 may also include other removable/non-removable and/or volatile/non-volatile electronic storage media. By way of example, FIG. 9 illustrates a hard disk drive 916 for reading from and writing to a (typically) non-removable, non-volatile magnetic media (not separately shown); a magnetic disk drive 918 for reading from and writing to a (typically) removable, non-volatile magnetic disk 920 (e.g., a "floppy disk"); and an optical disk drive 922 for reading from and/or writing to a (typically) removable, non-volatile optical disk 924 such as a CD-ROM, DVD-ROM, or other optical media. Hard disk drive 916, magnetic disk drive 918, and optical disk drive 922 are each connected to system bus 908 by one or more data media interfaces 926. Alternatively, hard disk drive 916, magnetic disk drive 918, and optical disk drive 922 may be connected to system bus 908 by one or more other separate or combined interfaces (not shown).

The disk drives and their associated electronically-accessible media provide non-volatile storage of electronically-executable instructions, such as data structures, program modules, and other data for computer 902. Although exemplary computer 902 illustrates a hard disk 916, a removable magnetic disk 920, and a removable optical disk 924, it is to be appreciated that other types of electronically-accessible media may store instructions that are accessible by an electronic device, such as magnetic cassettes or other magnetic storage devices, flash memory cards, CD-ROM, digital versatile disks (DVD) or other optical storage, random access memories (RAM), read only memories (ROM), electrically erasable programmable read-only memories (EEPROM), and so forth. In other words, any electronically-accessible media may be utilized to realize the storage media of the exemplary computing system and environment 900.

Any number of program modules (or other units or sets of instructions) may be stored on hard disk 916, magnetic disk 920, optical disk 924, ROM 912, and/or RAM 910, including by way of example, an operating system 926, one or more application programs 928, other program modules 930, and program data 932. Examples of instructions that are especially related to credentials and digitally signed objects, as well as associations between the two, are described further below with particular reference to FIG. 10.

A user may enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to processing unit 904 via input/output interfaces 940 that are coupled to system bus 908, but they may instead be connected by other interface and bus structures, such as a parallel port, a game port, a universal serial bus (USB) port, an IEEE 1394 interface, an IEEE 802.11 interface, and so forth.

A monitor 942 or other type of display device may also be connected to system bus 908 via an interface, such as a video adapter 944. In addition to monitor 942, other output peripheral devices may include components such as speakers (not shown) and a printer 946, which may be connected to computer 902 via input/output interfaces 940.

Computer 902 may operate in a networked environment using logical connections to one or more remote computers, such as a remote computing device 948. By way of example, remote computing device 948 may be a personal computer, portable computer (e.g., laptop computer, tablet computer, PDA, mobile station, etc.), a server, a router, a network computer, a peer device or other common network node, and the like. Remote computing device 948 is illustrated as a portable computer that may include many or all of the elements and features described herein relative to computer 902.

Logical connections between computer 902 and remote computer 948 are depicted as a local area network (LAN) 950 and a general wide area network (WAN) 952. Such networking environments are commonplace in offices, enterprise-wide computer networks, intranets, the Internet, fixed and mobile telephone networks, other wireless networks, and so forth.

When implemented in a LAN networking environment, computer 902 is connected to a local area network 950 via a network interface or adapter 954. When implemented in a WAN networking environment, computer 902 typically includes a modem 956 or other means for establishing communications over wide area network 952. Modem 956, which may be internal or external to computer 902, may be connected to system bus 908 via input/output interfaces 940 or any other appropriate mechanism(s). It is to be appreciated that the illustrated network connections are exemplary and that other means of establishing communication link(s) between computers 902 and 948 may be employed.

In a networked environment, such as that illustrated with computing environment 900, program modules or other instructions that are depicted relative to computer 902, or portions thereof, may be fully or partially stored in a remote memory storage device. By way of example, remote application programs 958 reside on a memory device of remote computer 948. Also, for purposes of illustration, application programs and other executable instructions such as operating system 926 are illustrated herein as discrete blocks, but it is recognized that such programs, components, and other instructions reside at various times in different storage components of computing device 902 (and/or remote computing device 948) and are executed by data processor(s) 904 of computer 902 (and/or those of remote computing device 948).

The methods and processes of FIGS. 4, 7, 8, and 11 are illustrated in flow diagrams that are divided into multiple blocks. However, the order in which the methods and processes are described is not intended to be construed as a limitation, and any number of the described blocks can be combined in any order to implement one or more methods or processes for managing digitally signed objects using credentials and/or associating credentials with signed objects. Furthermore, although the methods and processes are described herein with reference to the various implementations of FIGS. 1-3, 5-6, and 10 (as well as the exemplary system environment of FIG. 9) where applicable, the methods and processes can be implemented in any suitable hardware, software, firmware, or combination thereof and using any suitable network architectures, public key infrastructure (PKI) technologies, and so forth.

Figure 10:
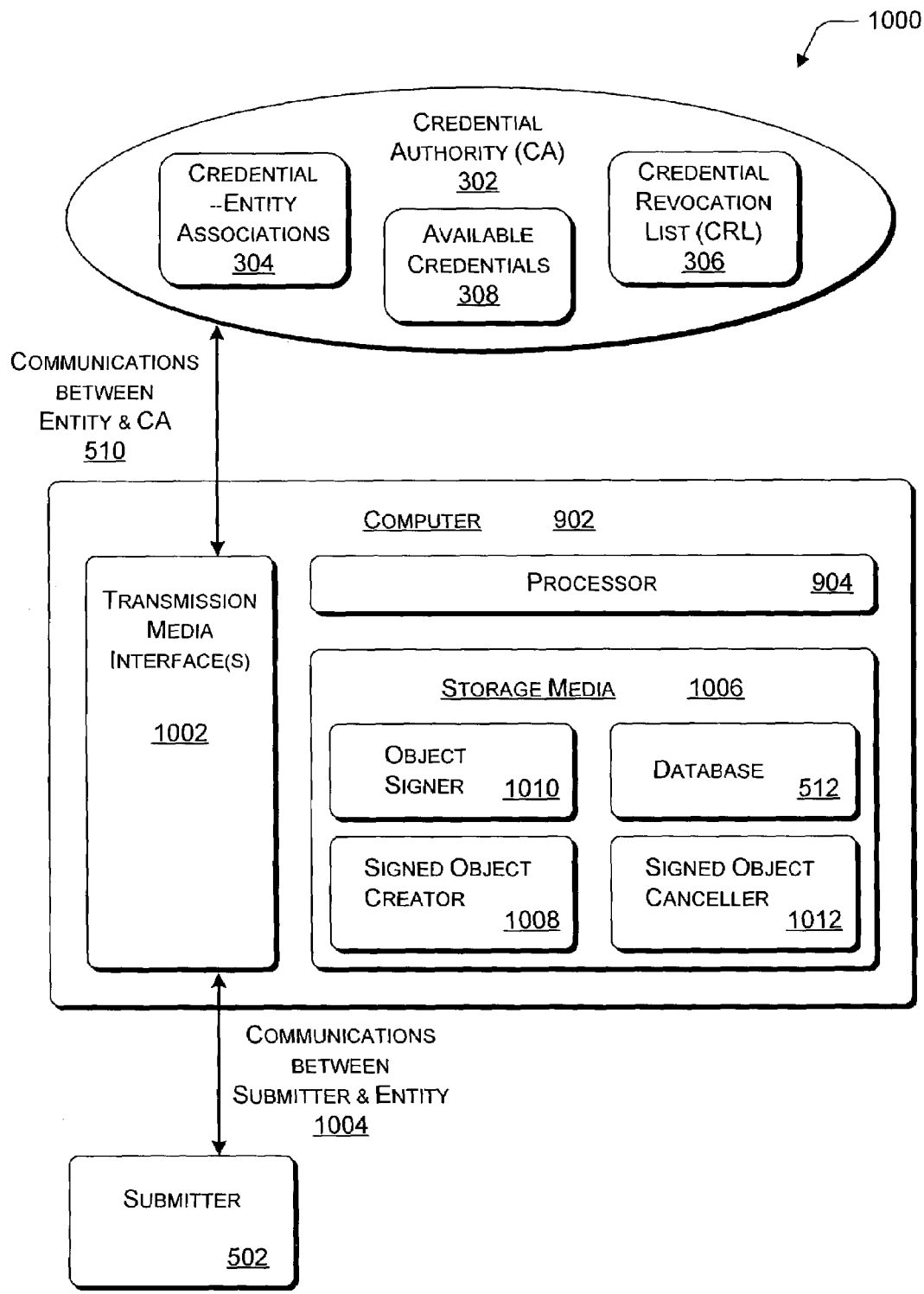
FIG. 10 illustrates yet another exemplary object-credential paradigm in which electronically-executable instructions are managing object creation and cancellation.

FIG. 10 illustrates yet another exemplary object-credential paradigm 1000 in which electronically-executable instructions are managing object creation and cancellation. A computer 902 utilizes one or more transmission media interfaces 1002 to communicate with credential authority 302 via communications between the entity & the CA 510 and with submitter 502 via communications between the submitter & the entity 1004. Transmission media interfaces 1002 may be realized as any wired or wireless interface, including but not limited to, network adapter 954 (of FIG. 9), modem 956, some combination thereof, and so forth.

Computer 902, in addition to one or more processors 904, includes at least one storage media 1006. Storage media 1006 may be realized as any electromagnetic, optical, etc. storage medium or media, including but not limited to, system memory 906 (of FIG. 9), hard disk drive 916, magnetic disk drive 918, is optical disk drive 922, some combination thereof, and so forth. As illustrated, storage media 1006 includes four sets of electronically-executable instructions: database 512, a signed object creator 1008, an object signer 1010, and a signed object canceller 1012. Alternatively, all or part of any one or more of database 512, signed object creator 1008, object signer 1010, and signed object canceller 1012 may be present on a transmission medium or media that is connected to transmission media interfaces 1002, as well as being executed using processors 904.

In a described implementation, signed object creator 1008 creates a signed object 108 from an object 104 and a credential 102 using a signing process 106 (of FIG. 1). Object signer 1010 is used to perform signing process 106. Signed object creator 1008 also adds an entry and/or modifies an existing entry of database 512 to indicate an association between the newly created signed object 108 and the credential 102 that was used to create it. In other words, the electronically-executable instructions of object signer 1010 and signed object creator 1008 may perform or otherwise effectuate the actions of at least blocks 704 and 706 (of FIG. 7), respectively. Signed object creator 1008 may also be responsible for acquiring credential 102.

Similarly, signed object canceller 1012 cancels the viability of a signed object 108 by revoking the credential 102 that was used to sign it. Signed object canceller 1012 accesses database 512 using an object identifier that identifies or represents signed object 108 to retrieve at least the credential identifier 202 of the credential 102 that was used to sign signed object 108. Signed object canceller 1012 then causes credential 102 to be revoked by sending a revocation request that includes at least credential identifier 202 to credential authority 302 using transmission media interface(s) 1002. In other words, the electronically-executable instructions of signed object canceller 1012 may perform or otherwise effectuate the actions of at least blocks 804 and 806 (of FIG. 8).

Although not shown, computer 902 may alternatively include a separate associator set of electronically-executable instructions that handle accessing database 512 on behalf of signed object creator 1008 and signed object canceller 1012 in order to establish and reference, respectively, signed object-credential associations that are stored in database 512. Other combinations and modifications of the explicitly-illustrated or other sets of electronically-executable instructions may also be employed.

Figure 11:
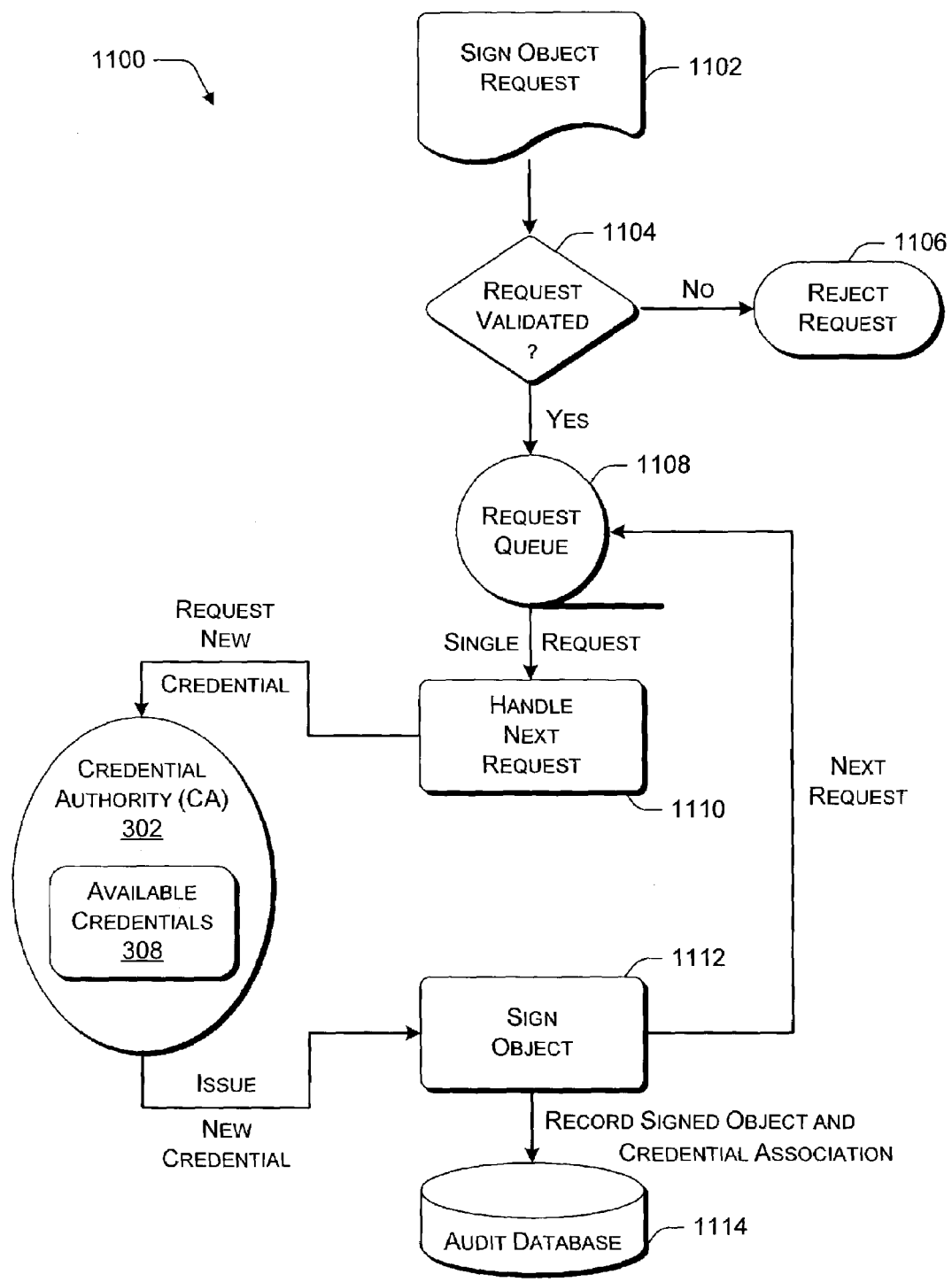
FIG. 11 is a flow diagram that illustrates another exemplary method for creating a signed object with credential association.

FIG. 11 is a flow diagram 1100 that illustrates another exemplary method for creating a signed object with credential association. Flow diagram 1100 includes seven (7) blocks 1102-1114 that are implemented by or otherwise occur in conjunction with an entity 310 (e.g., of FIG. 5). At block 1102, a sign object request is initiated. The sign object request, which is related to an object 104, may be initiated by anyone within or affiliated with entity 310 such as submitter 502. At block 1104, it is determined whether the request can be validated. For example, credential provider 506 may need to validate the sign object request through some security protocol(s). For instance, submitter 502 may need to have a valid identification/password pair, a smart card or other electronic identification, some biometric evidence, physical presence on a stipulated network, some combination thereof, and so forth.

If the sign object request cannot be validated (at block 1104), then the sign object request is rejected at block 1106. On the other hand, if the sign object request can be validated (at block 1104), then the sign object request is added to a request queue at block 1108. A request queue data structure can, for example, be substituted for the illustrated unused credentials 508 (of FIG. 5). At block 1110, the next request is taken off of the request queue to be handled. In order to sign the object 104 that is related to the sign object request, a new credential 102 is requested from credential authority 302.

Credential authority 302 may be a root credential authority, an intermediate credential authority, any other authorized representative thereof, and so forth. In response to the request for a new credential 102, credential authority 302 extracts a new credential 102 from available credentials 308. This extraction process may include selecting a new credential 102, randomly-generating a new credential 102, and so forth. Credential authority 302 issues the new credential 102 to entity 310. Thus, in flow diagram 1100, a new credential 102 may be minted for each object 104 to be signed.

At block 1112, the object is signed using the new credential. For example, object 104 that is related to the sign object request (of block 1102) is signed using the new credential 102 to produce a signed object 108. Flow diagram 1100 may continue at blocks 1108 and 1110 by handling the next sign object request from the request queue. Additionally, flow diagram 1100 continues by recording the signed object and credential association in an audit database at block 1114. For example, an object identifier of signed object 108 is associated with a credential identifier 202 of credential 102 in a database 512. Such a database, and accompanying associating, may alternatively be located and maintained at and/or by credential authority 302 and/or another third party.

Although systems, media, methods, etc. have been described in language specific to structural and functional features and/or methods, it is to be understood that the invention defined in the appended claims is not necessarily limited to the specific features or methods described. Rather, the specific features and methods are disclosed as exemplary forms of implementing the claimed invention.

The invention claimed is:

1. A method for managing viability of objects through credentials, the method comprising actions of:

signing an object with a credential to produce a signed object;

storing at least one entry in a database, the at least one entry linking an object identifier representing the signed object to at least one aspect of the credential;

receiving a signed object cancellation request for the signed object;

accessing the database at the at least one entry using the object identifier to retrieve the at least one aspect of the credential; and causing the credential to be revoked using the at least one aspect of the credential to cancel viability of the signed object responsive to the signed object cancellation request.

2. The method as recited in claim 1, further comprising the actions of:

receiving a sign object request from a submitter; and
providing the signed object to the submitter.

3. The method as recited in claim 1, wherein the at least one aspect of the credential comprises a credential identifier of the credential.

4. The method as recited in claim 3, wherein the credential identifier of the credential comprises a serial number that comports with an X.509-compliant standard.

5. The method as recited in claim 1, wherein the action of causing comprises the action of:

sending a credential revocation request that includes the at least one aspect of the credential to a credential authority.

6. The method as recited in claim 1, wherein the action of receiving comprises the action of receiving the signed object cancellation request from a submitter; and wherein the method further comprises the action of:

providing a signed object cancellation confirmation to the submitter.

7. One or more electronically-accessible media comprising electronically-executable instructions that, when executed, direct an electronic apparatus to perform the method as recited in claim 1.

8. A method for enabling object viability management, the method comprising actions of:

signing an object with a credential to produce a signed object;

noting an association between an object identifier that represents the signed object and the credential;

receiving a signed object cancellation request for the signed object;

retrieving the credential using the object identifier and the noted association; and causing the credential to be revoked so as to cancel viability of the signed object responsive to the signed object cancellation request.

9. The method as recited in claim 8, wherein the method is effectuated using a computing system.

10. The method as recited in claim 8, wherein the object comprises at least one of software code, a program, a routine, a document, a transaction, a contract, a driver, an active web control, a file, or an executable component.

11. The method as recited in claim 8, wherein the action of signing comprises the action of:

digitally signing the object with a private key that corresponds to a public key of the credential.

12. The method as recited in claim 8, wherein the action of noting comprises the action of:

noting the association between the object identifier and at least a credential identifier of the credential.

13. The method as recited in claim 8, wherein the action of noting comprises the action of:

recording the association between the object identifier and the credential in at least one data structure.

14. The method as recited in claim 8, wherein the action of noting comprises the action of:
sending the association between the object identifier and the credential over at least one transmission media.

15. One or more electronically-accessible media comprising electronically-executable instructions that when executed, direct an electronic apparatus to perform the method as recited in claim 8.

16. A method for enabling object viability management, the method comprising actions of:
receiving a sign object request from a submitter;
signing an object with a credential to produce a signed object responsive to the sign object request;
storing at least one entry in a database, the at least one entry linking the signed object to the credential;
providing the signed object to the submitter;
receiving a signed object cancellation request for the signed object from the submitter;
accessing the database at the at least one entry linking the signed object to the credential to retrieve the credential; and
causing the credential to be revoked so as to cancel viability of the signed object responsive to the signed object cancellation request.

17. The method as recited in claim 16, wherein the method is performed by a security unit that is part of an entity.

18. The method as recited in claim 17, wherein the submitter is also part of the entity.

19. The method as recited in claim 16, wherein the action of receiving a sign object request involves at least one security protocol.

20. The method as recited in claim 16, wherein the action of receiving a sign object request comprises the action of:
receiving the object from the submitter along with or as part of the sign object request.

21. The method as recited in claim 16, further comprising the action of:
requisitioning the credential from a pool of unused credentials.

22. The method as recited in claim 16, further comprising the action of:
requesting the credential from a credential authority responsive to the action of receiving a sign object request.

23. The method as recited in claim 16, wherein the action of signing comprises the action of:
signing the object with a private key that corresponds to a public key of the credential to produce the signed object.

24. The method as recited in claim 16, wherein the action of signing comprises the action of:
signing the object with at least a credential identifier of the credential to produce the signed object.

25. The method as recited in claim 16, further comprising the action of:
determining a hash value by applying a hashing function to at least one of the object or the signed object;
wherein the action of storing comprises the action of:
storing the hash value in the at least one entry in the database.

26. The method as recited in claim 16, wherein the action of storing comprises the action of:
storing in the at least one entry an object identifier that represents the signed object and a credential identifier of the credential.

27. The method as recited in claim 16, wherein the action of storing comprises the action of:
storing in the at least one entry (i) an object identifier that represents the signed object and (ii) a credential identifier, a time span, and at least one key of the credential.

28. One or more electronically-accessible media comprising electronically-executable instructions that, when executed, direct an electronic apparatus to perform the method as recited in claim 16.

29. A method for enabling object viability management, the method comprising actions of:
receiving a revocation request for a signed object, the revocation request comprising a request to cancel viability of the signed object;
accessing a database at an entry for the signed object to retrieve an associated credential, the associated credential having been used to sign an object to produce the signed object; and
causing the associated credential to be revoked.

30. The method as recited in claim 29, wherein the method is performed by a security unit that is part of an entity.

31. The method as recited in claim 29, wherein the action of receiving comprises the action of:
receiving the revocation request electronically from a submitter.

32. The method as recited in claim 31, wherein the method is performed by a security unit that is part of an entity; and wherein the submitter is also part of the entity.

33. The method as recited in claim 29, further comprising the actions of:
discovering that the viability of the signed object should be terminated; and
sending the revocation request for the signed object responsive to the discovering.

34. The method as recited in claim 29, wherein the revocation request includes an object identifier that represents the signed object; and
wherein the action of accessing comprises the action of:
locating the entry for the signed object in the database using the object identifier.

35. The method as recited in claim 34, wherein the object identifier comprises at least one of (i) a title of the object or the signed object, (ii) a description/abstract/summary/table of contents/index of the object or the signed object, (iii) the entirety of the object or the signed object or (iv) a hash value resulting from application of a hashing function to the object or the signed object.

36. The method as recited in claim 29, wherein the action of causing comprises the action of:
sending a revocation request for the associated credential to a credential authority, the revocation request including at least a credential identifier of the associated credential.

37. The method as recited in claim 36, wherein the credential identifier of the associated credential comprises a serial number that comports with an X.509-compliant standard.

38. One or more electronically-accessible media comprising electronically-executable instructions that, when executed, direct an electronic apparatus to perform the method as recited in claim 29.

39. An arrangement for managing viability of objects through credentials, the arrangement comprising:

signing means for signing an object with a credential to produce a signed object;

storing means for storing an object identifier that represents the signed object in association with the credential; and signed object cancellation means for canceling viability of the signed object, the signed object cancellation means comprising:

receiving means for receiving a signed object cancellation request for the signed object;

accessing means to access the storing means to retrieve the credential that is associated with the object identifier; and revocation means for revoking the associated credential to terminate the viability of the signed object.

40. The arrangement as recited in claim 39, wherein the arrangement comprises at least one computer.

41. The arrangement as recited in claim 39, wherein the arrangement comprises at least one electronically-accessible media.

42. The arrangement as recited in claim 39, wherein the signing means comprises one or more processors that are programmed to implement at least one public-key infrastructure (PKI) mechanism.

43. The arrangement as recited in claim 39, wherein the signing means utilizes at least one private key of a public-private key pair.

44. The arrangement as recited in claim 39, wherein the storing means comprises one or more storage media.

45. The arrangement as recited in claim 39, wherein the storing means comprises at least one database.

46. The arrangement as recited in claim 39, wherein the storing means comprises at least one database that includes a plurality of entries, at least one entry of the plurality of entries linking the object identifier that represents the signed object to the credential.

47. The arrangement as recited in claim 39, further comprising:

acquiring means for acquiring the credential.

48. The arrangement as recited in claim 47, wherein the acquiring means comprises:

requesting means for requesting the credential from a credential authority.

49. The arrangement as recited in claim 47, wherein the acquiring means comprises:

requisitioning means for requisitioning the credential from a pool of unused credentials.

50. An arrangement for managing viability of objects, the arrangement comprising:

receiving means for receiving a signed object cancellation request for a signed object;

ascertaining means for ascertaining a credential that is associated with the signed object, the credential associated with the signed object because the credential was used to sign an object to produce the signed object; and revoking means for causing the credential to be revoked responsive to the signed object cancellation request in order to terminate viability of the signed object.

51. The arrangement as recited in claim 50, further comprising:

signing means for signing the object with the credential to produce the signed object; and storing means for storing an object identifier that represents the signed object in association with the credential.

52. The arrangement as recited in claim 50, wherein the ascertaining means comprises database means for storing associations between credentials and signed objects.

53. The arrangement as recited in claim 50, wherein the object and the signed object comprise at least one of software code, a program, a routine, a document, a transaction, a contract, a driver, an active web control, a file, or an executable component.

54. The arrangement as recited in claim 50, wherein the ascertaining means comprises database means for retrieving the credential that is associated with the signed object.

55. The arrangement as recited in claim 50, wherein the ascertaining means comprises database means for retrieving the credential that is associated With the signed object using an object identifier that represents the signed object.

56. The arrangement as recited in claim 55, wherein the object identifier comprises at least one of (i) a title of the object or the signed object, (ii) a description/abstract/summary/table of contents/index of the object or the signed object, (iii) the entirety of the object or the signed object, or (iv) a hash value resulting from application of a hashing function to the object or the signed object.

57. The arrangement as recited in claim 50, wherein the arrangement comprises at least one server computer.

58. The arrangement as recited in claim 50, wherein the arrangement comprises at least one electronically-accessible media.

59. The arrangement as recited in claim 50, further comprising:

transmission media interface means for interfacing with at least one of (i) a central authority or (ii) a submitter of a revocation request, the revocation request identifying the signed object.

60. A system for managing object viability through credentials, the system comprising:

one or more media, the one or more media including signed-object-canceller electronically-executable instructions and a database linking credentials to signed objects; and one or more processors, the one or more processors capable of executing the electronically-executable instructions to perform actions comprising:

receiving a signed object cancellation request for a signed object;

accessing the database using an object identifier that represents the signed object to retrieve a credential that is linked thereto; and causing the credential to be revoked to cancel viability of the signed object responsive to the signed object cancellation request.

61. The system as recited in claim 60, wherein the credential comprises a credential identifier.

62. The system as recited in claim 60, wherein the credential comprises a credential identifier and an entity name.

63. The system as recited in claim 60, wherein the credential comprises a credential identifier, an entity name, and an indication of a credential authority that issued the credential.

64. The system as recited in claim 60, wherein the one or more media comprise at least one of (i) one or more storage media or (ii) one or more transmission media and/or transmission media adapters.

65. The system as recited in claim 60, wherein the one or more media further include object-signer electronically-executable instructions; and wherein the one or more processors are further capable of executing the electronically-executable instructions to perform an action comprising:
　　signing an object using the credential to produce the signed object.

66. The system as recited in claim 60, wherein the one or more media further include signed-object-creator electronically-executable instructions; and wherein the one or more processors are further capable of executing the electronically-executable instructions to perform an action comprising:
　　storing the object identifier as linked to the credential in at least one entry of the database.

\* \* \* \* \*